3,377,280
METHOD OF PREPARING GRAPHITE-METAL HALIDE COMPOUNDS
Adolf Knappwost, Hamburg, Germany, assignor to Molykote Produktions G.m.b.H., Munich, Germany
No Drawing. Filed Aug. 4, 1965, Ser. No. 477,287
Claims priority, application Germany, Aug. 12, 1964, K 53,736
7 Claims. (Cl. 252—30)

ABSTRACT OF THE DISCLOSURE

Graphite-metal halide lubricants are prepared by mixing metal powder with graphite and contacting the mass with a halogenating agent at elevated temperature.

---

This invention relates to a novel method for preparing graphite-metal halide compounds.

Graphite-metal halide compounds and particularly graphite-iron chloride compounds have been known for use as lubricants. Such compounds can be prepared with difficulty and at commercially unattractive expense by heating graphite with a metal halide, such as iron chloride, to several hundred degrees centigrade for a number of hours. Merely the inconvenience in the prior preparation of the iron III chloride and the difficulty of placing it in the oven and avoiding atmospheric moisture makes this known method of preparing graphite-iron chloride compounds impractical at the commercial level.

It is the object of this invention to introduce a technically simple and commercially practical method of preparing graphite-metal halide compounds. Other objects and advantages of this invention are detailed in or will be apparent from the disclosure and claims which follow.

This invention comprises admixing a metal powder with graphite and contacting the mixture with a halogenating agent.

The graphite can be employed in any desired form but the best results are achieved with finely divided graphite. The metal should also be as finely divided as is practical and, of course, the metal must be one which is capable of forming a graphite-metal halide compound.

The graphite and metal powders are mixed and contacted with a known halogenating agent. The reaction is best carried forward at an elevated temperature above 150° C. The upper limit on the reaction temperature is the temperature at which the metal halide formed will dissociate at a significant rate.

Especially good results are achieved when the graphite-metal halide product is removed from the reaction zone and is placed in a purification zone at a temperature exceeding the reaction temperature. This "purification" step frees the graphite-metal halide product of impurities.

The halogenating agents employed herein are well known for the purpose. Gaseous, elemental chlorine or bromine in a carrier gas, if desired, can be employed. Thus a stream of nitrogen carrying gaseous chlorine or bromine through the graphite-metal powder mixture has proven very useful.

Of course mixtures of metal powders as well as alloy powders can be employed herein. Generally preferred are the heavy metals and earth metals, particularly iron and copper and the like. However, alkaline metals and alkaline earth metals are not useful herein.

The metal can, of course, be employed in a compound form which will yield the metal under the reaction conditions of the invention. Thus a metal compound which will dissociate under the reaction conditions or which will undergo an exchange reaction with the halogenating agent can be employed.

The method of this invention can be carried forward continuously by adding new reactants to and removing the desired product from the reaction zone. The reaction zone can be externally heated as in an ordinary oven or resistance heating can be employed to advantage. The exclusion of moisture is very advantageous and heating in an inert atmosphere is suggested. The optional purification step will sublimate undesired halides formed during the reaction.

Generally, a reaction of 5 minutes to 2 hours followed by a 1–20 minute purification will produce an excellent product. Reaction duration and purification duration depend upon reactants as well as product purity desired.

The graphite-metal halide products are particularly useful as lubricating agents. These materials can be used alone or in combination with other lubricants, lubricant additives and/or lubricant carriers for lubricating applications.

Example

A homogeneous mixture was prepared employing 50 parts by weight of iron powder and 50 parts by weight of graphite. The mixture was placed in a vessel in an oven heated to 200° C. Chlorine gas was fed into a nitrogen stream and was carried through the graphite-iron powder mass. This was continued for 30 minutes. The graphite-iron III chloride product was then placed in a second oven and heated at 350° C. for 30 minutes. The product was cooled and comminuted to form a useful lubricating agent.

That which is claimed is:

1. A method for preparing novel lubricants comprising admixing finely divided graphite and a metal powder and thereafter contacting the mixture with a halogenating agent at a temperature in the range from 150° C. up to just below the temperature at which the metal halide formed will dissociate at a significant rate whereby a graphite-metal halide material is obtained.

2. The method of claim 1 further characterized in that the product obtained is purified by further heating above the temperature at which the halogenation was performed.

3. The method of claim 1 wherein the halogenating agent is a gaseous elemental halogen.

4. The method of claim 4 wherein the halogen is employed in an inert carrier gas.

5. The method of claim 1 wherein the graphite is mixed with a mixture of metal powders.

6. The method of claim 1 wherein the metal powder is introduced as a metallic compound which yields the desired metal under the conditions of reaction.

7. The method of claim 1 wherein the metal powder is introduced as a metal compound which reacts with the halogenating agent to produce the desired metal halide.

FOREIGN PATENTS 873,438    7/1961    Great Britain.

OSCAR R. VERTIZ, *Primary Examiner.*

HOKE S. MILLER, *Assistant Examiner.*